(12) United States Patent
Preiss

(10) Patent No.: US 8,364,163 B2
(45) Date of Patent: Jan. 29, 2013

(54) METHOD, SYSTEM AND APPARATUS FOR CONNECTING A PLURALITY OF CLIENT MACHINES TO A PLURALITY OF SERVERS

(75) Inventor: Bruno R. Preiss, Waterloo (CA)

(73) Assignee: Research In Motion Limited, Waterloo (CA)

( * ) Notice: Subject to any disclaimer, the term of this patent is extended or adjusted under 35 U.S.C. 154(b) by 809 days.

(21) Appl. No.: 12/390,832

(22) Filed: Feb. 23, 2009

(65) Prior Publication Data

US 2010/0217793 A1 Aug. 26, 2010

(51) Int. Cl.
  *H04M 3/42* (2006.01)
(52) U.S. Cl. ............... 455/453; 455/415; 455/414.1; 455/450; 709/203; 370/235
(58) Field of Classification Search ............... 370/235, 370/428, 399, 352; 709/203, 105, 205, 218, 709/219, 226, 229; 455/415
  See application file for complete search history.

(56) References Cited

U.S. PATENT DOCUMENTS

| 6,259,705 | B1 * | 7/2001 | Takahashi et al. | 370/465 |
|---|---|---|---|---|
| 6,330,602 | B1 * | 12/2001 | Law et al. | 709/224 |
| 6,567,806 | B1 | 5/2003 | Tsuchida | |
| 6,735,206 | B1 * | 5/2004 | Oki et al. | 370/395.32 |
| 2001/0055388 | A1 * | 12/2001 | Kaliski, Jr. | 380/30 |
| 2003/0108052 | A1 | 6/2003 | Inoue et al. | |
| 2004/0243709 | A1 | 12/2004 | Kalyanavarathan et al. | |
| 2006/0233106 | A1 | 10/2006 | Achlioptas et al. | |
| 2008/0152149 | A1 * | 6/2008 | Bauchot et al. | 380/279 |

OTHER PUBLICATIONS

Shen, H. Xu, C., "Hash-based proximity clustering for load balancing in heterogeneous DHT networks," Parallel and Distributed Processing Symposium, 2006. IPDPS 2006. 20th International, 10 pp.
Foundry ServerIron Switch Firewall Load Balancing Guide http://www.foundrynetworks.co.jp/services/documentation/siFWLB/ServerIron__FWLB__Hash__by__App.html (accessed Feb. 19, 2009).
Ruediger, Martin et al: "Accuracy and dynamics of Hash-based Load Balancing Algorithms for Multipath Internet Routing" Broadband Communications, Networks and Systems, 2006. Broadnets 2006. 3rd International Conference on, IEEE, PI, Oct. 1, 2006, pp. 1-10, XP031155928.
European Patent Application No. EP 09 15 3453 Search Report dated Jul. 17, 2009.

* cited by examiner

*Primary Examiner* — Kamran Afshar
*Assistant Examiner* — Khalid Shaheed
(74) *Attorney, Agent, or Firm* — Perry + Currier Inc.; Kristjan Spence

(57) ABSTRACT

According to embodiments described in the specification, a method, system and apparatus for connecting a plurality of client machines to a plurality of servers. Each of the servers has a unique server identifier. The method includes: receiving a request from one of the client machines; receiving a unique client identifier for the one of the client machines; selecting a unique server identifier from the plurality of unique server identifiers, based on a mapping function comprised of: the unique client identifier and a state indicator for each of the servers; and connecting the one of the client machines to one of the servers corresponding to the selected unique server identifier.

13 Claims, 13 Drawing Sheets

| Hash mod 12 \ Bit vector | 1 | 2 | 3 | 4 | 5 | 6 | 7 | 8 | 9 | A | B | C | D | E | F |
|---|---|---|---|---|---|---|---|---|---|---|---|---|---|---|---|
| 0 | 0 |   | 0 |   | 0 |   | 0 |   | 0 |   | 0 |   | 0 |   | 0 |
| 1 |   | 1 | 1 |   |   | 1 | 1 |   |   | 1 | 1 |   |   | 1 | 1 |
| 2 |   |   |   | 2 | 2 | 2 | 2 |   |   |   |   | 2 | 2 | 2 | 2 |
| 3 |   |   |   |   |   |   |   | 3 | 3 | 3 | 3 | 3 | 3 | 3 | 3 |
| 4 | 0 |   | 0 |   | 0 |   | 0 |   | 0 |   | 0 |   | 0 |   | 0 |
| 5 |   | 1 | 1 |   |   | 1 | 1 |   |   | 1 | 1 |   |   | 1 | 1 |
| 6 |   |   |   | 2 | 2 | 2 | 2 |   |   |   |   | 2 | 2 | 2 | 2 |
| 7 |   |   |   |   |   |   |   | 3 | 3 | 3 | 3 | 3 | 3 | 3 | 3 |
| 8 | 0 |   | 0 |   | 0 |   | 0 |   | 0 |   | 0 |   | 0 |   | 0 |
| 9 |   | 1 | 1 |   |   | 1 | 1 |   |   | 1 | 1 |   |   | 1 | 1 |
| 10 |   |   |   | 2 | 2 | 2 | 2 |   |   |   |   | 2 | 2 | 2 | 2 |
| 11 |   |   |   |   |   |   |   | 3 | 3 | 3 | 3 | 3 | 3 | 3 | 3 |

FIG. 4

| Hash mod 12 | Bit vector |   |   |   |   |   |   |   |   |   |   |   |   |   |   |
|---|---|---|---|---|---|---|---|---|---|---|---|---|---|---|---|
|   | 1 | 2 | 3 | 4 | 5 | 6 | 7 | 8 | 9 | A | B | C | D | E | F |
| 0 | 0 | 1 | 0 | 2 | 0 | 1 | 0 | 3 | 0 | 1 | 0 | 2 | 0 | 1 | 0 |
| 1 | 0 | 1 | 1 | 2 | 0 | 1 | 1 | 3 | 0 | 1 | 1 | 3 | 0 | 1 | 1 |
| 2 | 0 | 1 | 0 | 2 | 2 | 2 | 2 | 3 | 3 | 3 | 0 | 2 | 2 | 2 | 2 |
| 3 | 0 | 1 | 1 | 2 | 2 | 2 | 2 | 3 | 3 | 3 | 3 | 3 | 3 | 3 | 3 |
| 4 | 0 | 1 | 0 | 2 | 0 | 1 | 0 | 3 | 0 | 1 | 0 | 2 | 0 | 2 | 1 |
| 5 | 0 | 1 | 1 | 2 | 0 | 1 | 1 | 3 | 0 | 1 | 1 | 3 | 2 | 1 | 2 |
| 6 | 0 | 1 | 0 | 2 | 2 | 2 | 2 | 3 | 3 | 3 | 1 | 2 | 2 | 2 | 3 |
| 7 | 0 | 1 | 1 | 2 | 2 | 1 | 1 | 3 | 3 | 3 | 3 | 3 | 3 | 3 | 0 |
| 8 | 0 | 1 | 0 | 2 | 0 | 1 | 0 | 3 | 0 | 1 | 0 | 2 | 0 | 3 | 1 |
| 9 | 0 | 1 | 1 | 2 | 0 | 1 | 1 | 3 | 0 | 1 | 1 | 3 | 2 | 1 | 2 |
| 10 | 0 | 1 | 0 | 2 | 2 | 2 | 2 | 3 | 3 | 3 | 3 | 2 | 2 | 2 | 3 |
| 11 | 0 | 1 | 1 | 2 | 2 | 2 | 2 | 3 | 3 | 3 | 3 | 3 | 3 | 3 | 3 |

FIG. 5

| N | lcm(1, 2, ···, N) | $2^N - 1$ |
|---|---|---|
| 2 | 2 | 3 |
| 3 | 6 | 7 |
| 4 | 12 | 15 |
| 5 | 60 | 31 |
| 6 | 60 | 63 |
| 7 | 420 | 127 |
| 8 | 840 | 255 |
| 9 | 2,520 | 511 |
| 10 | 2,520 | 1,023 |
| 11 | 27,720 | 2,047 |
| 12 | 27,720 | 4,095 |
| 13 | 360,360 | 8,191 |
| 14 | 360,360 | 16,383 |
| 15 | 360,360 | 32,767 |
| 16 | 720,720 | 65,535 |

FIG. 6

Bit vector

| Hash mod 12 | 1 | 2 | 3 | 4 | 5 | 6 | 7 | 8 | 9 | A | B | C | D | E | F |
|---|---|---|---|---|---|---|---|---|---|---|---|---|---|---|---|
| 0 | 0 | 1 | 0 | 2 | 0 | 1 | 0 | 3 | 0 | 1 | 0 | 2 | 0 | 1 | 0 |
| 1 | 0 | 1 | 1 | 2 | 2 | 2 | 1 | 3 | 3 | 3 | 1 | 3 | 2 | 2 | 1 |
| 2 | 0 | 1 | 0 | 2 | 0 | 1 | 2 | 3 | 0 | 1 | 3 | 2 | 3 | 3 | 2 |
| 3 | 0 | 1 | 1 | 2 | 2 | 2 | 0 | 3 | 3 | 3 | 0 | 3 | 0 | 1 | 3 |
| 4 | 0 | 1 | 0 | 2 | 0 | 1 | 1 | 3 | 0 | 1 | 1 | 2 | 2 | 2 | 0 |
| 5 | 0 | 1 | 1 | 2 | 2 | 2 | 2 | 3 | 3 | 3 | 3 | 3 | 3 | 3 | 1 |
| 6 | 0 | 1 | 0 | 2 | 0 | 1 | 0 | 3 | 0 | 1 | 0 | 2 | 0 | 1 | 2 |
| 7 | 0 | 1 | 1 | 2 | 2 | 2 | 1 | 3 | 3 | 3 | 1 | 3 | 2 | 2 | 3 |
| 8 | 0 | 1 | 0 | 2 | 0 | 1 | 2 | 3 | 0 | 1 | 3 | 2 | 3 | 3 | 0 |
| 9 | 0 | 1 | 1 | 2 | 2 | 2 | 0 | 3 | 3 | 3 | 0 | 3 | 0 | 1 | 1 |
| 10 | 0 | 1 | 0 | 2 | 0 | 1 | 1 | 3 | 0 | 1 | 1 | 2 | 2 | 2 | 2 |
| 11 | 0 | 1 | 1 | 2 | 2 | 2 | 2 | 3 | 3 | 3 | 3 | 3 | 3 | 3 | 3 |

FIG. 12

|  |  | Figure 5 | Figure 5 | Figure 5 | Figure 12 | Figure 12 |
|---|---|---|---|---|---|---|
| Transition | | Ideal | Sticky Hashing | Sticky Hashing | Non-sticky Hashing | Non-sticky Hashing |
| From | To | Count | Count | Excess | Count | Excess |
| 1 | 3 | 6 | 6 | 0% | 6 | 0% |
| 1 | 5 | 6 | 6 | 0% | 6 | 0% |
| 1 | 9 | 6 | 6 | 0% | 6 | 0% |
| 2 | 3 | 6 | 6 | 0% | 6 | 0% |
| 2 | 6 | 6 | 6 | 0% | 6 | 0% |
| 2 | A | 6 | 6 | 0% | 6 | 0% |
| 4 | 5 | 6 | 6 | 0% | 6 | 0% |
| 4 | 6 | 6 | 6 | 0% | 6 | 0% |
| 4 | C | 6 | 6 | 0% | 6 | 0% |
| 8 | 9 | 6 | 6 | 0% | 6 | 0% |
| 8 | A | 6 | 6 | 0% | 6 | 0% |
| 8 | C | 6 | 6 | 0% | 6 | 0% |
| 3 | 7 | 4 | 5 | 8% | 8 | 33% |
| 3 | B | 4 | 5 | 8% | 8 | 33% |
| 5 | 7 | 4 | 5 | 8% | 8 | 33% |
| 5 | D | 4 | 5 | 8% | 8 | 33% |
| 6 | 7 | 4 | 5 | 8% | 8 | 33% |
| 6 | E | 4 | 5 | 8% | 8 | 33% |
| 9 | B | 4 | 5 | 8% | 10 | 50% |
| 9 | D | 4 | 5 | 8% | 8 | 33% |
| A | B | 4 | 5 | 8% | 10 | 50% |
| A | E | 4 | 5 | 8% | 8 | 33% |
| C | D | 4 | 5 | 8% | 8 | 33% |
| C | E | 4 | 5 | 8% | 8 | 33% |
| 7 | F | 3 | 3 | 0% | 9 | 50% |
| B | F | 3 | 3 | 0% | 9 | 50% |
| D | F | 3 | 3 | 0% | 9 | 50% |
| E | F | 3 | 3 | 0% | 9 | 50% |
| Average | | | | 4% | | 23% |

FIG. 13

METHOD, SYSTEM AND APPARATUS FOR CONNECTING A PLURALITY OF CLIENT MACHINES TO A PLURALITY OF SERVERS

FIELD

The specification relates generally to server load balancing, and specifically to a method, system and apparatus for connecting a plurality of client machines to a plurality of servers.

BACKGROUND

Client machines send a wide variety of requests to service providers. In some cases, an incoming request at the service provider may be handled by one of several servers operated by the service provider. Multiple requests from a given computing device, however, are often disadvantageously distributed amongst different servers. If requests from a client machine are sent to different servers, the state information associated with that client machine is migrated to other servers, consuming additional bandwidth and computational resources. Hash-based load balancing schemes have been proposed, however these schemes work as long as the number of servers is substantially static. In practice the number of servers may change. For example, under various prior art methodologies, when a server fails, the load from all clients is remapped, often unnecessarily.

BRIEF DESCRIPTIONS OF THE DRAWINGS

Embodiments are described with reference to the following figures, in which:

FIG. 4 depicts a tabular representation of a partial mapping function for the method of FIG. 3, according to a non-limiting embodiment;

FIG. 5 depicts a completed tabular representation of the mapping function of FIG. 4, according to a non-limiting embodiment;

FIG. 6 depicts a tabular enumeration of various required dimensions of the tabular representation of FIG. 5, according to a non-limiting embodiment;

FIG. 12 depicts a tabular representation of another mapping function, according to a non-limiting embodiment; and FIG. 13 depicts a tabular representation of a comparison between the mapping functions of FIG. 5 and FIG. 12.

DETAILED DESCRIPTION OF THE EMBODIMENTS

Figure 1:
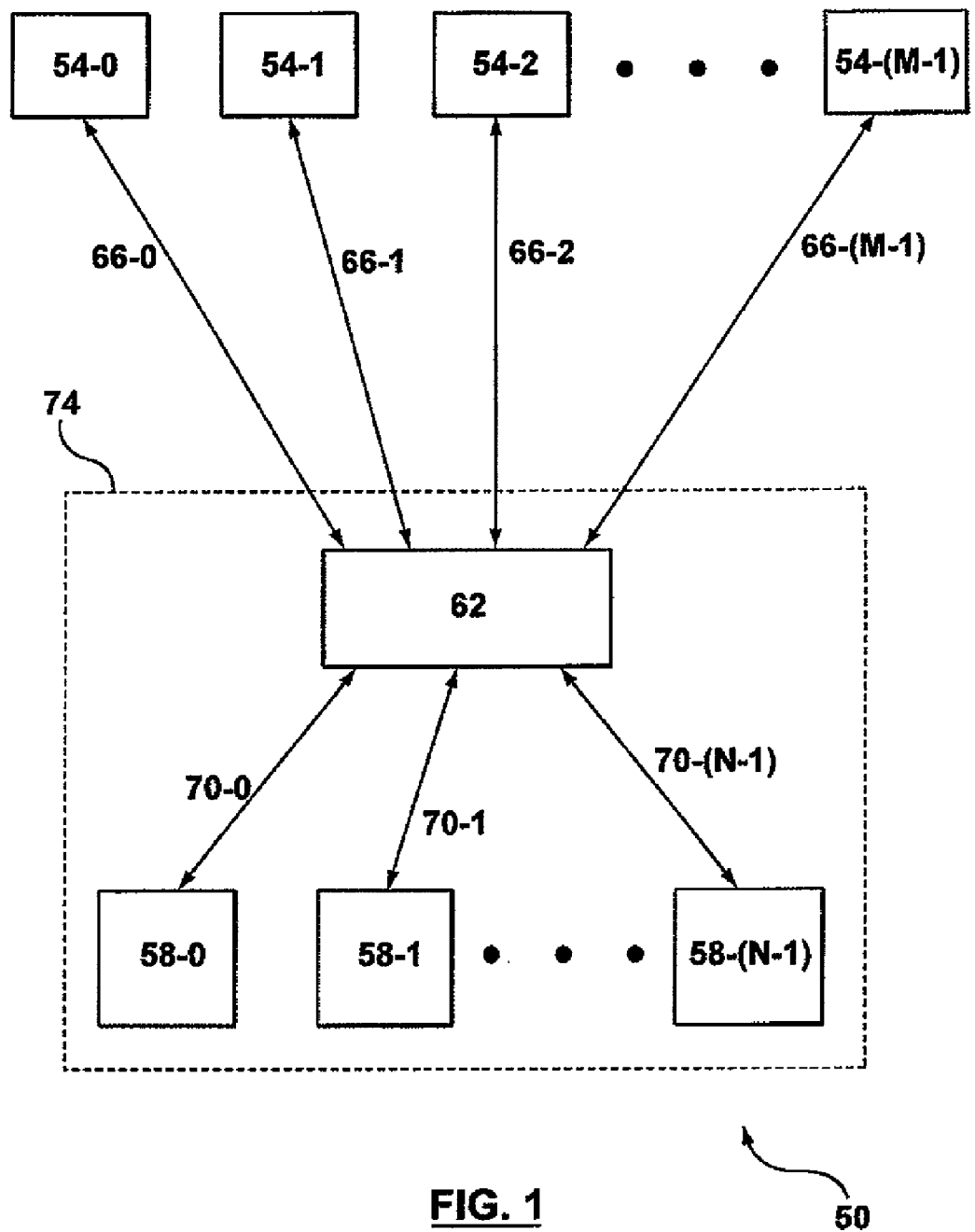
FIG. 1 depicts a system for connecting client machines to servers, according to a non-limiting embodiment.

Referring now to FIG. 1, a load-balancing scenario is presented with respect to a system indicated generally at 50. System 50 comprises a first plurality M of first computing devices in the form of client machines, indicated at 54-0, 54-1, 54-2 . . . 54-(M−1) (generically referred to as a client machine 54 or a client machine 54-$i$, and collectively as client machines 54. This convention is used elsewhere herein). System 50 also comprises a second plurality N of second computing devices in the form of servers, indicated at 58-0, 58-1 . . . 58-(N−1), where M can be much greater than N. Each server 58 is configured to be identified by a unique server identifier. In a present embodiment, for convenience and ease of explanation, the unique server identifier for each server 58 is taken to be the final digit of the reference numeral used herein to identify that server 58. For example, the unique server identifier of server 58-0 is "0." Other examples of unique server identifiers will occur to those skilled in the art, such as Internet Protocol ("IP") address, Media Access Control ("MAC") address, hardware serial number or any other unique machine identification, or any combination thereof. A load balancer 62 intercepts each request from each client machine 54, the request being transmitted via a link 66. Load balancer 62 then selects a server 58 to service that request, and forwards the request to the selected server 58 via the appropriate link 70. Servers 58 and load balancer 62 can be operated by a common service provider 74. Service provider 74 can, for example, host a website on servers 58, and can employ load balancer 62 to balance incoming Hypertext Transfer Protocol ("HTTP") requests among servers 58. It will be appreciated, however, that servers 58 and load balancer 62 can also be operated by any number of different entities.

Client machines 54 can be based on any known computing or electronic device environment including a processor, volatile memory (e.g. Random Access Memory ("RAM")), non-volatile memory (e.g. read only memory ("ROM"), Electrically Eraseable Programmable Read Only Memory ("EEPROM"), Flash Memory), input and output devices (e.g. keyboard, trackball, display) and communication interfaces for communicating over links 66 and 70 via wireless or wired connections. Client machines 54 may be, for example, cell phones, smart phones, desktop computers and the like.

Servers 58 may be based on any known server environment including a module that houses one or more central processing units, volatile memory, persistent memory (e.g. hard disk devices) and network interfaces to allow servers 58 to communicate over links 70 and 66.

It will be understood that the nature of links 66 which interconnect client machines 54 and load balancer 62, and links 70 which interconnect load balancer 62 and servers 58, is not particularly limited. Links 66 and 70 are based on any combination of architectures that will support interactions between client machines 54 and servers 58. For example, links 66 may be based on core mobile network infrastructure (e.g. Global System for Mobile communications ("GSM"); Code Division Multiple Access ("CDMA"); CDMA 2000; 3G; 4G) and may also include the Internet as well as appropriate gateways and backhauls. Links 70 may be based on a T1, T3 or any other suitable wired or wireless connection between load balancer 62 and servers 58.

Figure 2:
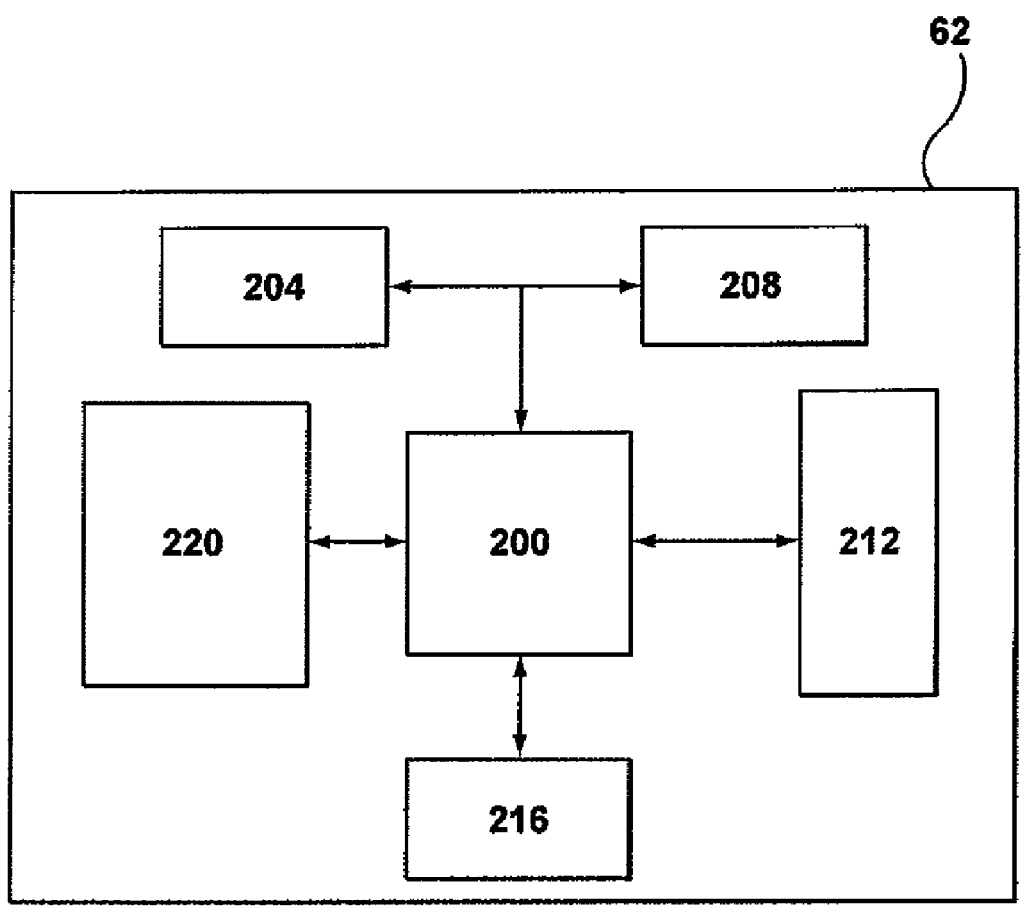
FIG. 2 depicts a load balancer of the system of FIG. 1, according to a non-limiting embodiment.

Referring now to FIG. 2, a schematic block diagram shows load balancer 62 in greater detail. Load balancer 62 is configured to evenly distribute incoming requests from client machines 54 to the active ones of servers 58.

Load balancer 62 includes a processor 200 which communicates with a non-volatile storage unit 208 (e.g. read only memory ("ROM"), Electrically Eraseable Programmable Read Only Memory ("EEPROM"), Flash Memory) and a volatile storage unit 204 (e.g. random access memory ("RAM")). Processor 200 also communicates with a network interface 212 allowing load balancer 62 to communicate over links 66 and 70. Load balancer 62 may also include one or more input devices such as a keyboard 216, and one or more output devices such as a display 220. It will be understood that the structure depicted in FIG. 2 is purely exemplary. For example, in some embodiments (not shown) load balancer 62 may include a plurality of processors. In some embodiments, load balancer 62 may additionally include a plurality of network interfaces, or may also include further input devices such as a mouse, a microphone and the like.

Computer readable code embodying programming instructions that implement the functional teachings of load balancer 62 as described herein are typically maintained in a computer readable storage medium, for example in non-volatile storage unit 208, and used by processor 200 which makes appropriate utilization of volatile storage unit 204 during the execution of such programming instructions.

Figure 3:
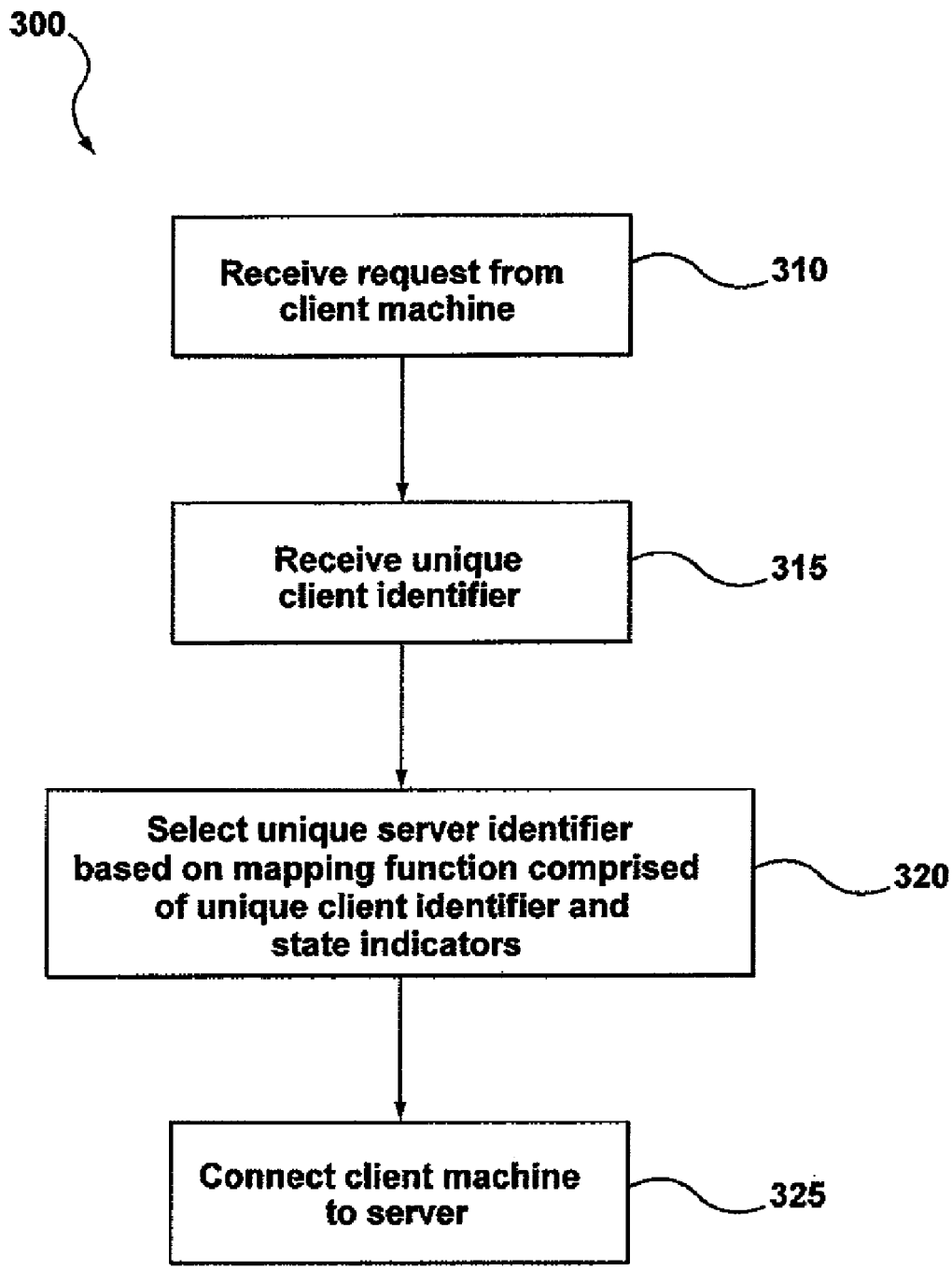
FIG. 3 depicts a flowchart of a method for connecting client machines to servers, according to a non-limiting embodiment.

Referring now to FIG. 3, a flow chart is provided depicting a method, indicated generally at 300, for connecting a plurality of client machines to a plurality of servers. Method 300 will be described in conjunction with system 50. It will be understood, however, that both system 50 and method 300 may be varied and such variations are within the scope of the present teachings.

In general, method 300 begins at block 310 with the receipt of a request at load balancer 62. The request originates from a client machine 54 and is destined for service provider 74. For example, the request may be a request to view a portion of a web page hosted by service provider 74 on servers 58.

Method 300 continues at block 315 with the receipt of a unique client identifier at load balancer 62. In a present embodiment for convenience and ease of explanation, the unique client identifier of a given client machine 54 is taken to be the reference numeral used to identify that client machine 54 in the drawings. For example, the unique client identifier of client machine 54-0 in FIG. 1 is "54-0." Other examples of unique client identifiers will occur to those skilled in the art, such as IP address, MAC address, hardware serial number or any other unique machine identification, or any combination thereof. The unique client identifier can be obtained from the request received at block 310, and thus block 310 and block 315 can be performed substantially simultaneously. In a present embodiment, performance of block 315 also includes the generation of a hashed unique client identifier at load balancer 62. The hashed unique client identifier can be an integer value generated on the basis of a hash of the unique client identifier of the client machine 54. For example, for the case of an IP address as a unique client identifier, given a request from a particular client machine 54-$i$, a hashed unique client identifier may be generated by hashing the IP address of that client machine 54-$i$:

$$\text{hash}=h(\text{addr}_{54-i})$$

where h( ) is a suitably constructed hash function. For the case of an IP address as a unique client identifier, the hash function can, for example, simply compute the sum of the bytes comprising the IP address, although many other hash functions will occur to those skilled in the art. For example, the hash function h( ) may be computed over the source (client machine 54-$i$) and destination IP addresses and ports. It will be appreciated that in other embodiments (not shown), the hashed unique client identifier may be received at load balancer 62 as part of the received request. In other words, the hashed unique client identifier may be determined by the originating client machine 54 or an intermediate network component. In still other embodiments (not shown) the unique client identifier can be used for the remainder of method 300, and the generation of a hashed unique client identifier can be foregone.

Method 300 continues at block 320. At block 320 a unique server identifier is selected at load balancer 62. The selected unique server identifier corresponds to an active one of servers 58 for servicing the request received at block 310. The unique server identifier is selected based on a mapping function. In order to allow for servers 58 to be added and removed (that is, to change states between active and inactive), the mapping function is comprised of both (a) the hashed unique client identifier (generated at block 315) of the client machine 54-$i$ which originated the request, and (b) a state indicator for each server. It will be noted that in other embodiments, the mapping function can be comprised of the unique client identifier rather than the hashed unique client identifier. The state indicator provides an indication of whether a given server is active or inactive. An active server, as will now be appreciated by those skilled in the art, is able to service requests from client machines 54, while an inactive server is not able to service such requests. In a present embodiment, the state indicators for servers 58 are contained within a bit vector representing the set of active ones of servers 58.

The bit vector can be defined as follows:

$$B=b_{N-1}b_{N-2}\ldots b_2b_1b_0$$

where $b_i$ is "1" if server 58-$i$ is active; "0" if server 58-$i$ is inactive. The state indicators are maintained in volatile storage unit 204 or non-volatile storage unit 208 of load balancer 62. It will be appreciated that the state indicators may be updated in a variety of ways. For example, load balancer 62 may poll servers 58 at certain intervals. If no response is received from a particular server 58 within a predefined time period, the state indicators maintained in memory at load balancer 62 may be updated to indicate that server 58 is inactive. As another example, in a present embodiment each server 58 periodically transmits a message to load balancer 62. So long as such messages continue to be received from a given server 58, the state indicator maintained at load balancer 62 for that server 58 indicates activity. If no messages are received from a given server 58 for a predetermined amount of time, the state indicator for that server 58 is updated to indicate inactivity. In a present embodiment in which state indicators are contained within the above-mentioned bit vector, the bit vector would therefore be updated to provide a 0 in the bit corresponding to that particular server 58.

Thus, in the present embodiment, given a request from a client machine 54, a unique server identifier is generally selected as follows at block 320 of method 300:

$$\text{server}=g(\text{hash},B)$$

where g( ) is a suitably constructed mapping function.

The mapping function g( ) is constructed to allow load balancer 62 to distribute the load represented by incoming requests from client machines 54 substantially evenly across all the active ones of servers 58. As a general example, there may be from 1 to N active servers 58. This has implications for the range of the hash function h( ), or any other function used to generate hashed unique client identifiers. It will be understood that in order to balance the load over two servers 58, the range of hash function h( ) is a multiple of two; to balance the load over three servers 58, the range of hash function h( ) is a multiple of three; and so on. It follows that in order to balance the load over N servers 58 as depicted in FIG. 1, the range of hash function h( ) is a multiple of N. Therefore, the smallest possible range for the hash function h( ) can be defined as the least-common multiple of the first N integers, lcm(1, 2, . . . , N). Thus, for a request received from a client machine 54-*i* at load balancer 62, a suitable mapping function can be generally formulated as:

$$\text{server} = g(h(\text{addr}_{54\text{-}i}) \bmod (\text{lcm}(1, 2, \ldots, N)), B)$$

The mapping function g( ) is constructed in a way that provides the "stickiness," or consistency, property. That is, requests from a given client machine 54 substantially result in the same unique server identifier selection (that is, are substantially mapped to the same one of servers 58). The following illustrates how such a mapping function can be constructed.

For this exemplary construction of a mapping function g( ) it is assumed that N=4. That is, system 50 includes four servers 58, any one of which may be active or inactive. The range of the hash function is therefore lcm(1,2,3,4)=12 and there are 15 valid combinations of state indicators represented by the bit vector B that represents the set of active ones of servers 58. (The case where all servers are inactive—that is, the case where B=0000—is not valid since no load balancing can be conducted if there are no active servers 58 for servicing requests at service provider 74.) Construction of the exemplary mapping function g( ) in tabular format will first be described.

A tabular representation of the mapping function g( ) is constructed as follows. The table has twelve rows (one for each value of the range of the hash function h( )) and fifteen columns (one for each value of the bit vector B containing a state indicator for each server 58).

FIG. 4 shows the first step in the construction of the mapping function. Construction begins in the right-most column which corresponds to all servers active—that is, where B=1111, or a hexadecimal value of "F." This column is completed in by assigning the rows in round-robin fashion to each of the servers 58, indicating which server 58 a given row is assigned to by way of the corresponding unique server identifier (0, 1, 2 or 3).

Each of the remaining columns in the table of FIG. 4 is partially completed by copying the unique server identifiers from the right-most column (column F) corresponding to the active server(s) 58 in the given column. For example, column E corresponds to the case where servers 58-1, 58-2, and 58-3, are active while server 58-0 is inactive—that is, where B=1110. Thus, column E is partially completed by copying the unique server identifiers "1," "2," and "3" from the right-most column. The unique server identifier "0" is not inserted into column E, as in the situation represented by column E, server 58-0 is inactive and cannot service requests. Thus, rows 0, 4 and 8 are not yet assigned a unique server identifier.

FIG. 5 shows the second step in the construction of the mapping function. In the second step, the remaining entries are filled one column at a time. In each column the entries are filled by assigning unique server identifiers for the active ones of servers 58 in round-robin fashion.

For example, consider column E. The active ones of servers 58 are servers 58-1, 58-2, and 58-3. Unique server identifiers 1, 2 and 3 (corresponding to servers 58-1, 58-2 and 58-3 therefore assigned in round-robin fashion to rows 0, 4, and 8 of column E. The effect of assigning the remaining rows to active ones of servers 58 in round-robin fashion is to substantially balance the load on the active ones of servers 58.

As can be seen from the completed tabular mapping function represented in FIG. 5, the three rows (0, 4 and 8) of column E which would have been assigned to unique server identifier 0 if all servers 58 were active, as in column F, are instead assigned evenly among unique server identifiers 1, 2 and 3, corresponding to active servers 58-1, 58-2 and 58-3.

An exemplary C program fragment will now be described for providing the above-described tabular mapping function g( ). The program fragment represents a method for connecting a plurality of first client machines to a plurality of servers, and is provided below with numbered lines for later reference.

```
1    unsigned g(unsigned hash, unsigned N, unsigned mask,
2        unsigned L, unsigned zeroes, unsigned ones,
3        unsigned* active, unsigned* adjust)
4    {
5        unsigned result = 0;
6        unsigned row = hash % L;
7        unsigned group = row / N;
8        unsigned offset = row % N;
9        if (mask & (1 << offset))
10       {
11           result = offset;
12       }
13       else
14       {
15           result = active[(group * zeroes + adjust[offset]) % ones];
16       }
17       return result;
18   }
```

The inputs to the program fragment are as follows:

An integer variable, hash, that contains a hashed unique client identifier as described above.

An integer variable, N, that represents the number of servers 58 included in system 50. It will be noted that this number N therefore indicates the maximum number of active servers 58 in system 50. It is assumed in a present embodiment that N is a constant.

An integer variable, mask, that is a bit vector containing a status indicator for each server 58, and thereby represents the set of active ones of servers 58.

An integer variable, L, that contains the least-common multiple of the first N integers. It will be noted that in a present embodiment, since N is a constant, so too is L. Therefore, L need be computed only once.

An integer variable, zeroes, that contains the number of zeroes in the bit vector. More generally, zeroes contains a count of the number of status indicators indicating inactivity on the part of their respective servers 58. Thus, the number of zeroes is equal to the number of inactive ones of servers 58. This value can be generated from the bit vector mask at every performance of the method represented by the program fragment. However, as with mask, the value of zeroes is subject to change when the active ones of servers 58 change. Therefore, in a present embodiment the value of zeroes is regenerated when the active ones of servers 58 change.

An integer variable, ones, that contains the number of ones in the bit vector. More generally, ones contains a count of the number of status indicators indicating activity on the part of their respective servers 58. Thus, the number of ones is equal to the number of active ones of servers 58. This value can be generated from the bit vector mask at every performance of the method represented by the program fragment. However, as with mask and zeroes, the value of ones is subject to change when the active ones of servers 58 change. Therefore, in a present embodiment the value of ones is regenerated when the active ones of servers 58 change.

An array of integers, active, whose length is equal to the number of active ones of servers 58 and that contains the unique server identifiers corresponding to the active ones of servers 58. The array active can be generated from the bit vector mask at every performance of the method represented by the program fragment. However, as discussed above the contents of active is subject to change when the active ones of servers 58 change. Therefore, in a present embodiment the value of active is regenerated when the active ones of servers 58 change.

An array of integers, adjust, of length N that contains values computed as follows. The ith element of the array contains a count of the number of zeroes in the least-significant i-1 bits of the bit vector, mask. The array adjust can be generated from the bit vector mask at every performance of the method represented by the program fragment. However, as discussed above, the contents of adjust is subject to change when the active ones of servers 58 change. Therefore, in a present embodiment the value of adjust is regenerated when the active ones of servers 58 change.

It will now be apparent that the running time of this program fragment is O(1). When the active ones of servers 58 change (that is, when one or more servers 58 that were previously active become inactive, or vice versa), the values of mask, zeroes, ones, active, and adjust are regenerated at load balancer 62. These values can be regenerated in O(N) time (where N is the number of servers 58 included in system 50). The values of mask, zeroes, ones, active, and adjust require O(N) storage (where N is the number of servers 58 included in system 50).

Following the above description of the exemplary mapping function g( ), it will now become apparent that either of the tabular or algorithmic approaches may be used. In particular, for some values of N the entire mapping function go may be computed and stored by load balancer 62, for example in non-volatile storage unit 208, in a table similar to Table 2. Such a tabular format may be dynamically constructed as described above with respect to FIGS. 4 and 5, or may be constructed by computing the above-discussed algorithm for each row using all values of the bit vector, mask. The time required to select a unique server identifier in such a case is always O(1) because all that is required is a table lookup. No additional computation is required when the active ones of servers 58 change.

When the mapping function go is stored at load balancer 62 in a tabular format as described above, the size of the table required is lcm(1, 2, . . . , N)×($2^N$−1). FIG. 6 provides a table enumerating the required table dimensions for various values of N.

Following the selection of a unique server identifier at block 320, method 300 continues at block 325. At block 325, load balancer 62 connects the client machine 54 which originated the request with the server 58 corresponding to the unique server identifier selected at block 320. In the present embodiment, load balancer 62 forwards the request to the server 58 corresponding to the selected unique server identifier, completing the performance of block 325.

Figure 7:
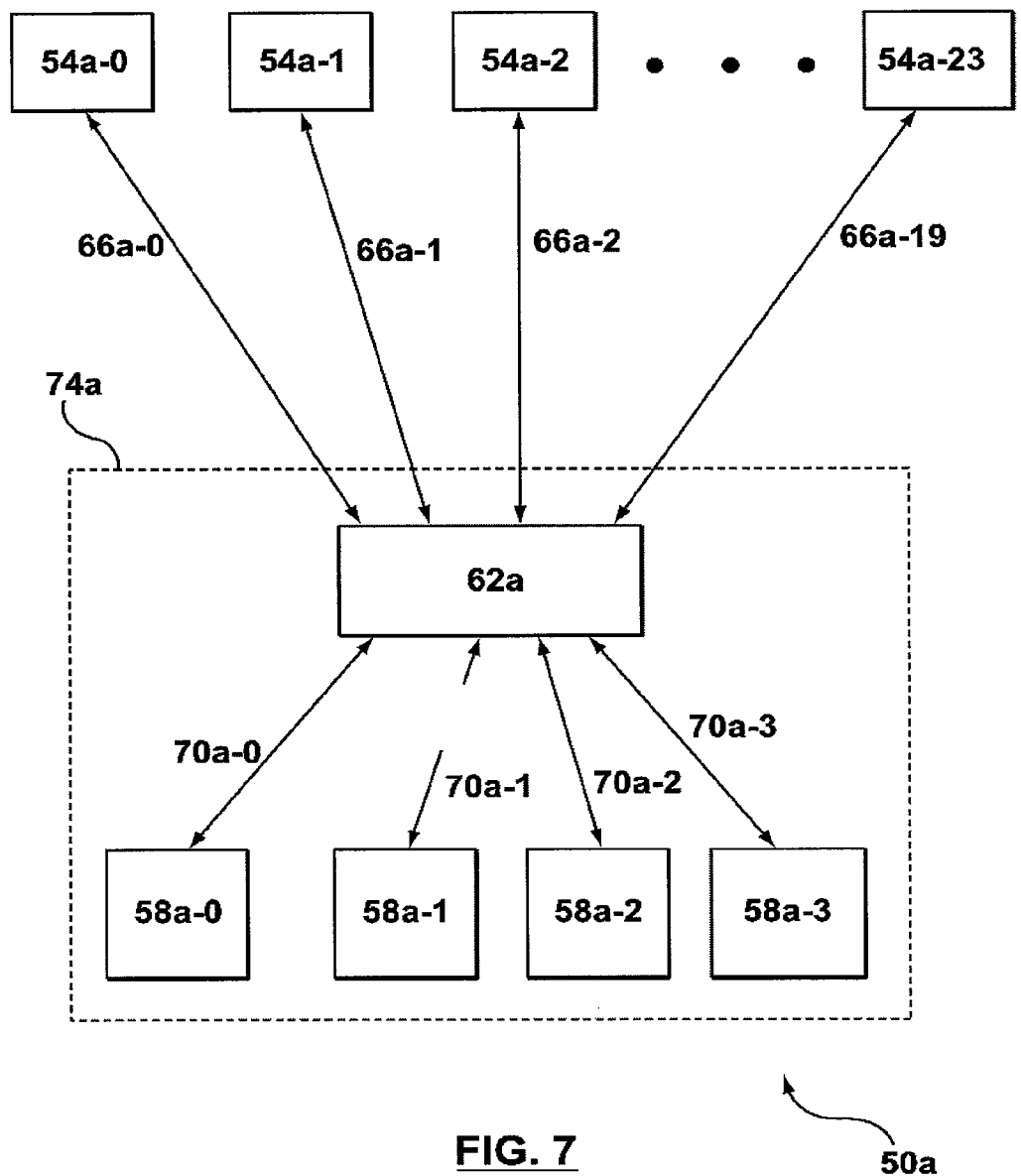
FIG. 7 depicts a system for connecting client machines to servers, according to another non-limiting embodiment.
Figure 8:
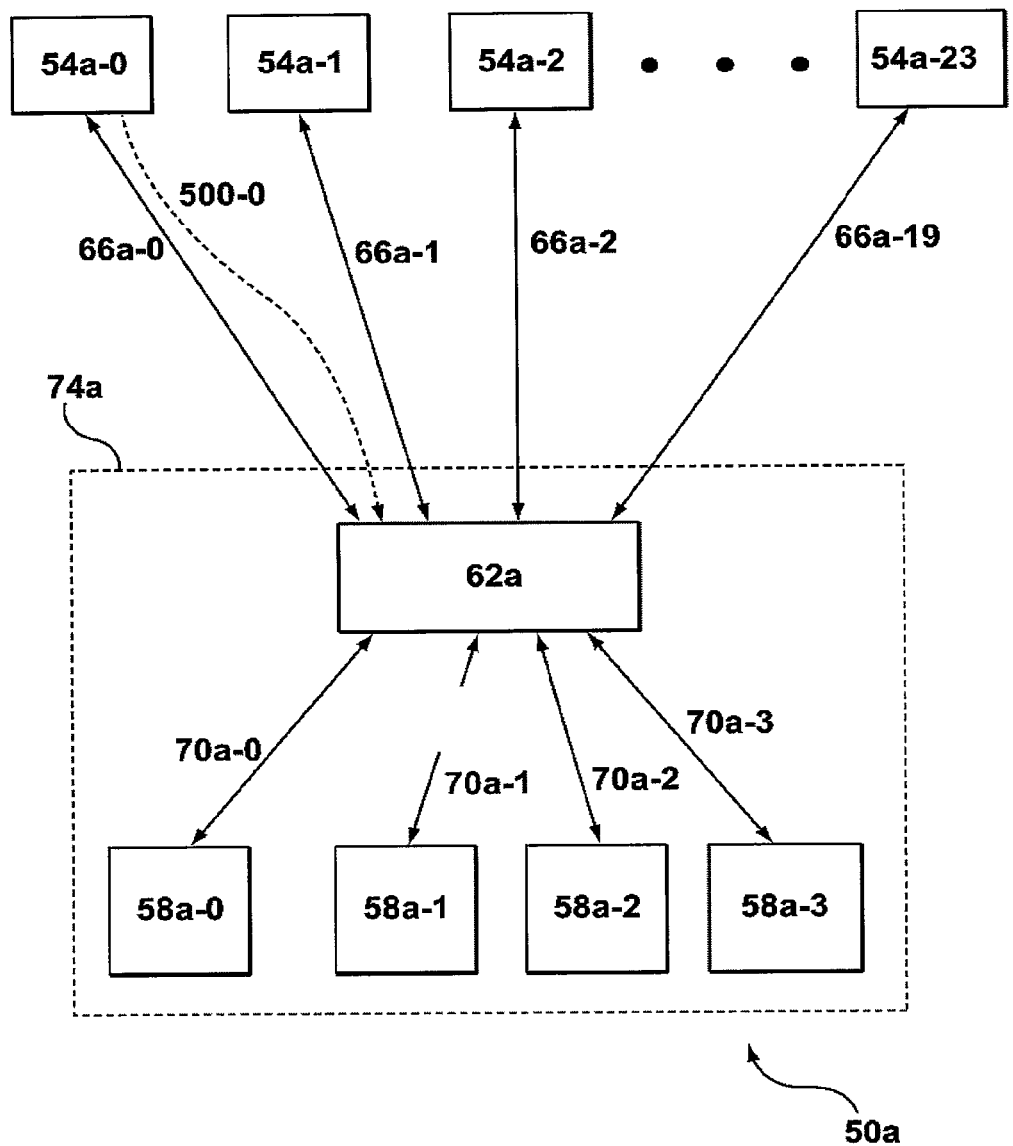
FIG. 8 depicts the performance of block 310 of the method of FIG. 3, according to a non-limiting embodiment.

By way of further explanation, an exemplary performance of method 300 will now be described in connection with a system 50a, depicted in FIG. 7. Where system 50a includes like components to those of system 50, those components are identified by the same reference numerals as in FIG. 1, with the addition of a suffix "a." It will be noted from FIG. 7 that system 50a includes four servers 58a and twenty-four client machines 54a. Thus, the value of the least common multiple L as described above is twelve. For this exemplary performance of method 300, it will be assumed that servers 58a-0, 58a-2 and 58a-3 are active, while server 58a-1 is inactive. Link 70a-1 has been severed to indicated the inactivity of server 58-1. Thus, the state indicators for servers 58a may be represented in the form of a bit vector, mask, as follows:

mask=1101

Figure 9:
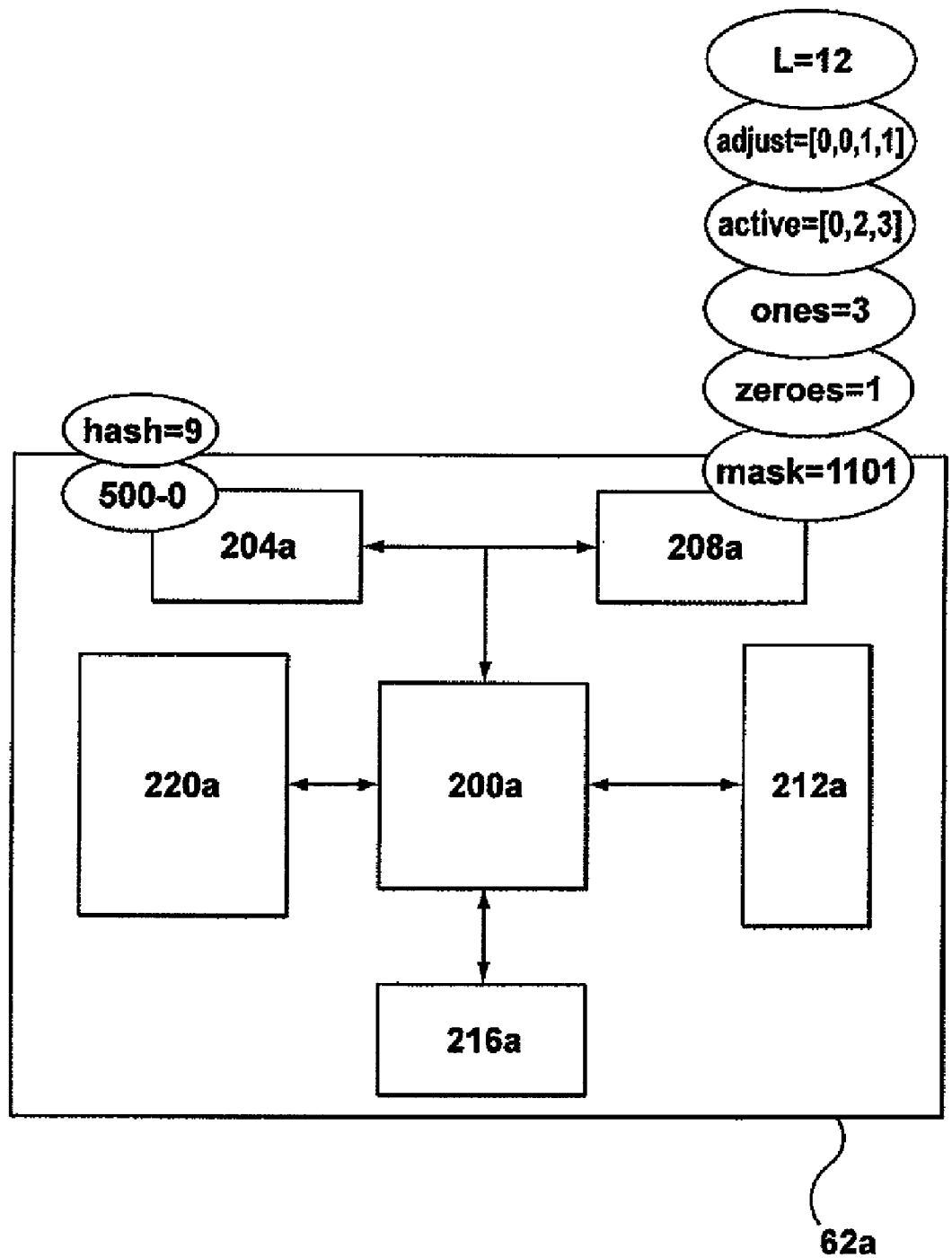
FIG. 9 depicts a load balancer of the system of FIG. 4, according to a non-limiting embodiment.

The state indicators may be stored by load balancer 62a, for example in non-volatile storage unit 208a, as shown in FIG. 9.

It will be appreciated that as a result of the above value of mask, the following values of inputs, which may also be stored by load balancer 62a, to the program fragment described earlier are as follows:

mask=1101
zeroes=1
ones=3
active=[0,2,3]
adjust=[0,0,1,1]

Method 300 begins at block 310 with the receipt of a request from client machine 54a-0. Performance of block 310 is depicted at FIG. 58, where a request 500-0 originates from client machine 54a-0. Request 500-0 is associated with service provider 74a, and is thus received at load balancer 62a. As shown in FIG. 9, request 500-0 may be stored at load balancer 62a, for example in volatile storage unit 204a.

Returning to FIG. 3, performance of method 300 continues at block 315 with the receipt of a unique client identifier and the generation of a hashed unique client identifier at load balancer 62a. As described earlier, the unique client identifier will be taken as the reference numeral "54a-0" for client machine 54a-0 from FIG. 7, for the purposes of explanation. In this exemplary performance of method 300, the hashed unique client identifier is generated from the sum of the digits (that is, "5," "4," and "0") in the unique client identifier. Therefore, load balancer 62a is configured in a present embodiment to determine the hashed unique client identifier via the following hash function h( ):

hash=$h$(54a-0)=5+4+0=9

Once generated at block 315, the hashed unique client identifier may be stored by load balancer 62a, for example in volatile storage unit 204a, as shown in FIG. 9.

Referring again to FIG. 3, method 300 continues at block 320 with the selection of a unique server identifier based on the mapping function g( ), comprised of the state indicators stored by load balancer 62a, and the hashed unique client identifier also stored by load balancer 62a. In the present embodiment, load balancer 62a selects a unique server identifier by executing, at processor 200a in conjunction with computer readable instructions stored at non-volatile storage unit 208a, the program fragment described above. It will be understood that processor 200a makes use, as necessary, of non-volatile storage unit 208a and volatile storage unit 204a during the execution of the program fragment. For example, intermediate values calculated in the course of execution may be stored in volatile storage unit 204a.

In particular, line 6 of the program fragment results in the generation of the value "row" as follows: row=hash mod L=9 mod 12=9. Similarly, at lines 7 and 8, the values "group" and "offset" are generated as follows:

group=int(row/$N$)=int(9/4)=2 offset=row mod $N$=9 mod 4=1.

At line 9 of the program fragment, the result of (mask & (1<<offset)) is 1101 & 0010=0000=FALSE. Therefore, execution of the program fragment proceeds to line 15, where a unique server identifier is selected as follows:

result=active[(2*1+0)mod 3]=active[2 mod 3]=active[2]=3

Thus, the unique server identifier selected at block 320 is 3, corresponding to server 58a-3. It will be noted that the same result can be achieved in other embodiments (not shown)

where load balancer 62a maintains in memory a table as shown in FIG. 5. In these other embodiments, a unique server identifier is selected by processor 200a of load balancer 62a from the column corresponding to a bit vector value of "1101", or hexadecimal "D," and from the row corresponding to a value of hash mod L=9 mod 12=9. As seen in FIG. 5, the unique server identifier provided at column D and row 9 is "3," corresponding to server 58a-3.

Figure 10:
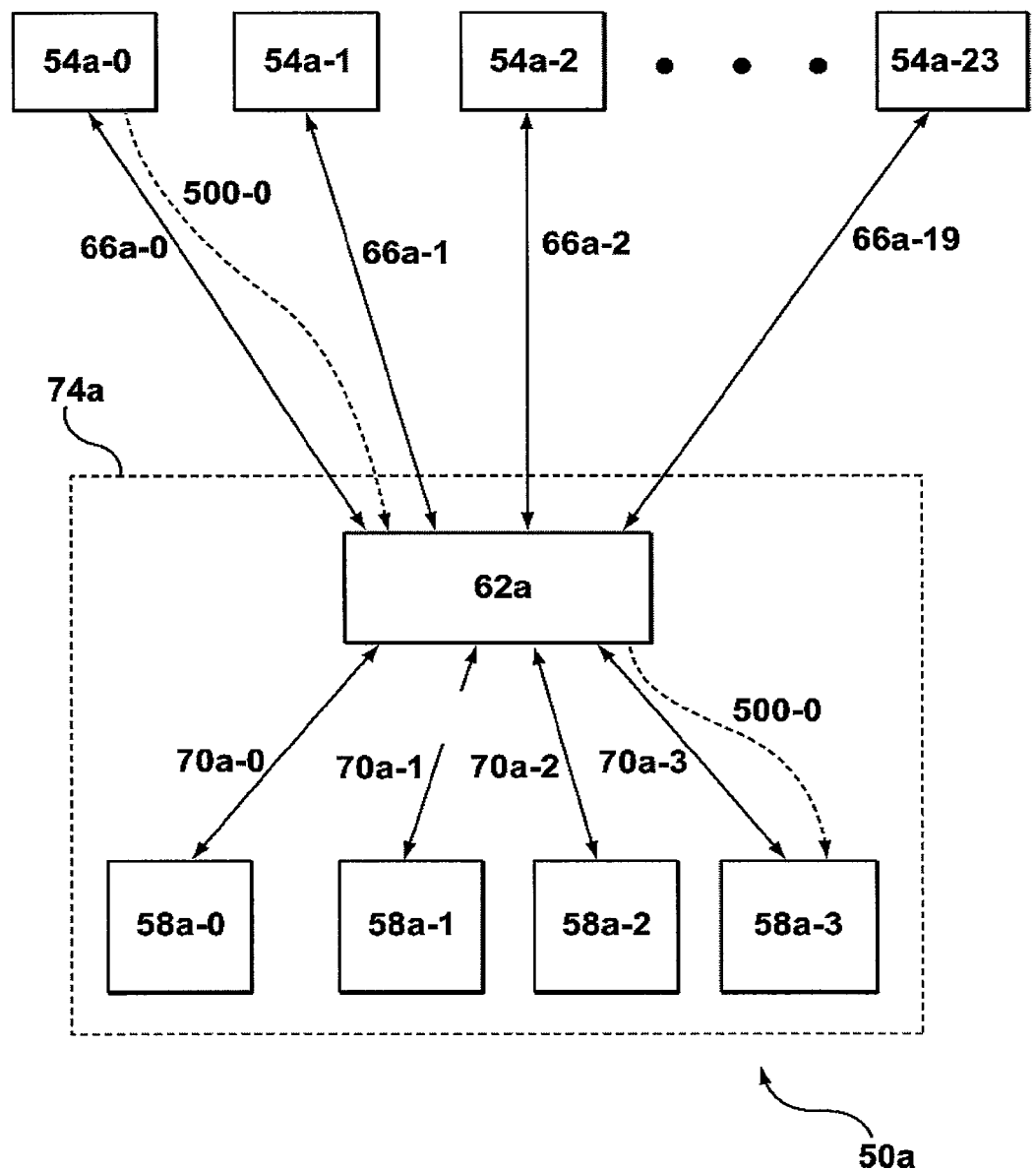
FIG. 10 depicts the performance of block 325 of the method of FIG. 3, according to a non-limiting embodiment.

Performance of method 300 continues with the connection of client machine 54a-0 and server 58a-3 at block 325. Performance of block 325 is depicted at FIG. 10, where request 500-0 is forwarded by load balancer 62a to server 58a-3 for servicing.

From the above description of the present embodiment, certain advantages will now be apparent. For example, the above mapping function substantially satisfies a stickiness, or consistency, property. That is, multiple requests from a given client machine 54 substantially result in the selection of the same unique server identifier, as long as the corresponding server 58 is active. To evaluate the quality of the mapping function with respect to stickiness, all server activation states are enumerated, and for each state, all possible state transitions resulting from the addition or removal of a single server 58 are considered.

Figure 11:
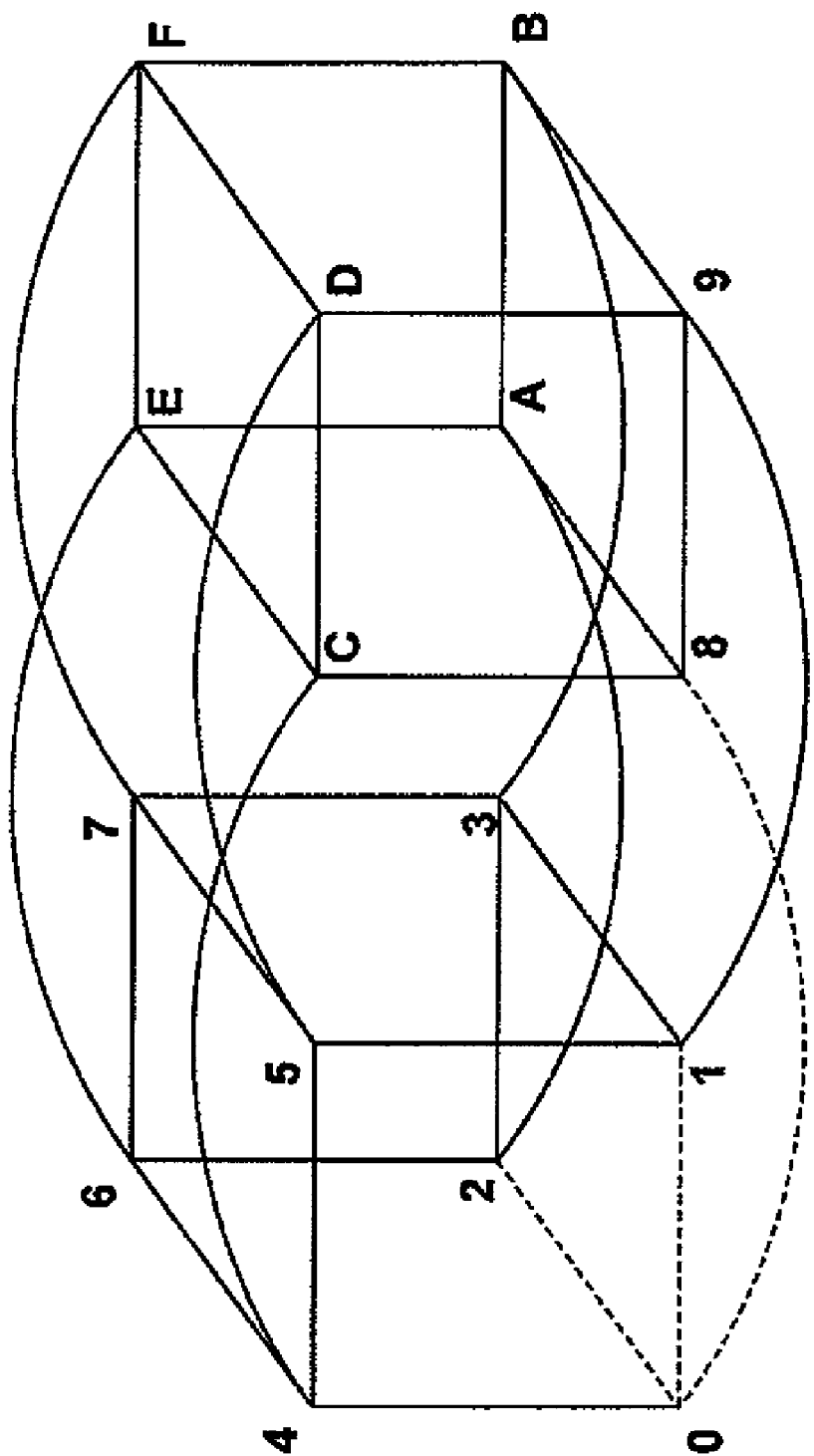
FIG. 11 depicts a state transition diagram for the system of FIG. 4, according to a non-limiting embodiment.

FIG. 11 illustrates that the states and state transitions for N servers 58 forms an N-dimensional hypercube (with the exception of state "0" which is not valid and is therefore indicated in dashed lines). The set of servers 58 active in adjacent states in the hypercube differ by exactly one server 58. In general, there are $N(2^N-1)$ transitions (with the "0" state and associated transitions removed). For example, for N=4 there are twenty-eight transitions as shown in FIG. 11.

For each transition between a state "i" and a state "j", the corresponding columns of the tabular mapping function representation in FIG. 5 are compared, and the number of rows in which the unique server identifiers are different is counted. These correspond to client machines 54 which are remapped as a result of the activation or deactivation of a server 58 to which requests from such client machines 54 were previously assigned.

For the purpose of the above-described comparison, a tabular representation of a modular hash-based mapping function was constructed (see FIG. 12).

For the above mapping function, a hashed unique client identifier is generated as described above. The hashed unique client identifier is then mapped to a number in the range [0, N−1] to select a unique server identifier using modular arithmetic:

$$g(\text{hash}) = \text{hash} \bmod N$$

Note that in FIG. 12, unique server identifiers for active ones of servers 58 are assigned to rows in round-robin fashion.

FIG. 13 shows the results of the analysis. The table shows, for each possible transition between columns in FIGS. 5 and 12, the number of rows that change as a result of the transition. The fraction of rows that change represents the fraction of clients that experience a change in server assignment as a result of the transition.

FIG. 13 shows three cases: The first represents a hypothetical ideal in which the minimum number of rows are remapped as the result of the transition. The second case represents the performance of the mapping function described above and represented in FIG. 5. The third represents the modular hash-based mapping function represented in FIG. 12.

Averaged over all possible transitions, the mapping function represented in FIG. 5 remaps 4% of client machines 54 unnecessarily relative to the ideal case. By comparison the modular hash-based mapping function represented in FIG. 12 remaps 23% of the clients unnecessarily.

Additionally, the preceding analysis assumes that all transitions are equally likely. In fact, in realistic scenarios the mapping function represented in FIG. 5 has greater stickiness than the modular hash-based mapping function represented in FIG. 12. For example, in the cases where there are initially 4 servers 58 active and only single server 58 failures are considered (i.e., double and triple failures are ignored), there are only four possible transitions (7-F, B-F, D-F, and E-F of FIG. 13). The average excess for the mapping function represented in FIG. 5 is 0% and in all cases the excess for the mapping function represented in FIG. 12 is 50%. In other words, the mapping function described above in conjunction with method 300 and represented in FIG. 5 is ideal; whereas in the mapping function represented in FIG. 12, half of the client machines 54 are remapped unnecessarily as a result of a server 58 failure.

Other advantages will also occur to those skilled in the art. For example, load balancer 62 does not need to maintain a per-client state, and thus reduces consumption of storage and computational resources. It will be understood that the above advantages are merely exemplary, and that other advantages may also be achieved in the present or other embodiments.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

I claim:

1. A method for connecting a plurality of client machines to a plurality of servers; each of said servers having a unique server identifier, the method comprising:
    receiving a request from one of said client machines;
    receiving a hashed unique client identifier for said one of said client machines, wherein said hashed unique client identifier is a hash comprising at least a unique client identifier corresponding to said one of said client machines;
    selecting a unique server identifier from said plurality of unique server identifiers, based on a mapping function configured to select a particular one of said unique server identifiers for a given client machine as long as the server corresponding to said particular one of said unique server identifiers is active, the mapping function comprising:
        Hash mod L, where Hash is said hashed unique client identifier and L is a least-common-multiple of a set of integers from 1 to N, where N is a count of said plurality of servers; and
        a value representative of state indicators for each of said servers; and
    connecting said one of said client machines to one of said servers corresponding to said selected unique server identifier.

2. The method of claim 1, wherein said state indicator for each of said servers is a one if active, and a zero if inactive.

3. The method of claim 2, further comprising:
    maintaining a bit vector 'B' containing said state indicators, according to $B = b_{N-1} b_{N-2} \ldots b_2 b_1 b_0$, where $b_i$ is a state indicator for an ith server of said plurality of servers.

4. The method of claim 1, further comprising:
receiving said unique client identifier;
wherein receiving said hashed unique client identifier comprises generating said hashed unique client identifier.

5. The method of claim 1, wherein connecting said one of said client machines to said one of said servers corresponding to said selected unique server identifier comprises:
forwarding said request to said one of said servers corresponding to said selected unique server identifier.

6. The method of claim 1, wherein said unique client identifier comprises at least one of an IP address of said client machine and a MAC address of said client machine.

7. The method of claim 6, wherein said hashed unique client identifier further comprises at least one of an additional IP address and an additional MAC address.

8. A server for connecting a plurality of client machines to a plurality of servers; each of said servers having a unique server identifier, the server comprising:
a network interface;
a memory; and
a processor interconnected with said network interface and said memory, said processor configured to receive a request from one of said client machines via said network interface; to store said request in said memory; to receive a hashed unique client identifier for said one of said client machines, wherein said hashed unique client identifier is a hash comprising at least a unique client identifier corresponding to said one of said client machines; to select a unique server identifier from said plurality of unique server identifiers, based on a mapping function configured to select a particular one of said unique server identifiers for a given client machine as long as the server corresponding to said particular one of said unique server identifiers is active, the mapping function comprising:
Hash mod L, where Hash is said hashed unique client identifier and L is a least-common-multiple of a set of integers from 1 to N, where N is a count of said plurality of servers; and
a value representative of state indicators for each of said servers;
said processor further configured to connect said one of said client machines to one of said servers corresponding to said selected unique server identifier.

9. The server of claim 8, wherein said state indicator for each of said servers is a one if active, and a zero if inactive.

10. The server of claim 9, said processor being further configured to maintain in said memory a bit vector 'B' containing said state indicators, according to $B=b_{N-1} b_{N-2} \ldots b_2 b_1 b_0$, where $b_i$ is a state indicator for an ith server of said plurality of servers.

11. The server of claim 8, said processor being further configured to receive said unique client identifier, and to receive said hashed unique client identifier by generating said hashed unique client identifier.

12. The server of claim 8, said processor being further configured to connect said one of said client machines to said one of said servers by forwarding said request via said network interface to said one of said servers corresponding to said selected unique server identifier.

13. A non-transitory computer readable storage medium containing computer readable instructions executable by a processor for implementing a method for connecting a plurality of client machines to a plurality of servers; each of said servers having a unique server identifier, the method comprising:
receiving a request from one of said client machines;
receiving a hashed unique client identifier for said one of said client machines, wherein said hashed unique client identifier is a hash comprising at least a unique client identifier corresponding to said one of said client machines;
selecting a unique server identifier from said plurality of unique server identifiers, based on a mapping function configured to select a particular one of said unique server identifiers for a given client machine as long as the server corresponding to said particular one of said unique server identifiers is active, the mapping function comprising:
Hash mod L, where Hash is said hashed unique client identifier and L is a least-common-multiple of a set of integers from 1 to N, where N is a count of said plurality of servers; and
a value representative of state indicators for each of said servers; and
connecting said one of said client machines to one of said servers corresponding to said selected unique server identifier.

* * * * *